United States Patent
Klimenko

(10) Patent No.: US 9,869,539 B2
(45) Date of Patent: Jan. 16, 2018

(54) ROTATION ANGLE AND TORSION ANGLE SENSOR

(71) Applicant: Bourns, Inc., Riverside, CA (US)

(72) Inventor: Valeri Klimenko, München (DE)

(73) Assignee: BOURNS, INC., Riverside, CA (US)

( * ) Notice: Subject to any disclaimer, the term of this patent is extended or adjusted under 35 U.S.C. 154(b) by 146 days.

(21) Appl. No.: 14/172,386

(22) Filed: Feb. 4, 2014

(65) Prior Publication Data

US 2014/0218015 A1    Aug. 7, 2014

(30) Foreign Application Priority Data

Feb. 4, 2013    (DE) .................... 10 2013 001 829

(51) Int. Cl.
| | |
|---|---|
| *G01B 7/30* | (2006.01) |
| *G01B 5/24* | (2006.01) |
| *G01D 5/245* | (2006.01) |
| *G01D 5/249* | (2006.01) |
| *G01L 5/22* | (2006.01) |
| *G01L 3/10* | (2006.01) |

(52) U.S. Cl.
CPC ............. *G01B 7/30* (2013.01); *G01B 5/24* (2013.01); *G01D 5/249* (2013.01); *G01D 5/2452* (2013.01); *G01L 3/104* (2013.01); *G01L 5/221* (2013.01)

(58) Field of Classification Search
CPC .. G01B 7/30; G01B 5/24; G01R 33/10; G01L 3/10; G01L 5/22; G01D 5/24
USPC .................................................... 324/207.25
See application file for complete search history.

(56) References Cited

U.S. PATENT DOCUMENTS

| | | | |
|---|---|---|---|
| 2,260,036 | A |   | 10/1941 Kuehni |
| 4,809,557 | A |   | 3/1989 Maurer et al. |
| 4,907,461 | A |   | 3/1990 Eto et al. |
| 5,009,446 | A | * | 4/1991 Davis .................... B60D 1/40 |
| | | | 280/477 |
| 5,115,685 | A |   | 5/1992 Jorgensen et al. |
| 5,165,288 | A |   | 11/1992 Timtner |
| 5,353,648 | A |   | 10/1994 Hrubes et al. |
| 6,370,968 | B1 |   | 4/2002 Yasui |
| 6,854,322 | B2 |   | 2/2005 Sherman et al. |
| 7,258,027 | B2 |   | 8/2007 Oike et al. |
| 7,562,591 | B2 |   | 7/2009 Lee |
| 7,841,231 | B2 |   | 11/2010 Kang et al. |

(Continued)

FOREIGN PATENT DOCUMENTS

| | | |
|---|---|---|
| DE | 38 02 684 A1 | 8/1988 |
| DE | 10 2009 022 712 A1 | 12/2010 |

(Continued)

*Primary Examiner* — Jermele M Hollington
*Assistant Examiner* — Zannatul Ferdous
(74) *Attorney, Agent, or Firm* — Michael Best & Friedrich LLP

(57) ABSTRACT

The rotation angle and torsion angle sensor detects both the rotational position of a shaft and a torque applied to the shaft torque. The shaft a first shaft part and a second shaft part, which are interconnected by a torsion bar. A sensor disc is coupled via a rigid circumferentially and axially flexible membrane with the first shaft part. The sensor disc is coupled to a drive wheel via a coupling device, in such a way that the sensor disc is displaced in the axial direction upon relative rotation of the two shaft parts against each other, wherein the membrane bends in the axial direction.

13 Claims, 8 Drawing Sheets

(56) References Cited

U.S. PATENT DOCUMENTS

Figure 1:
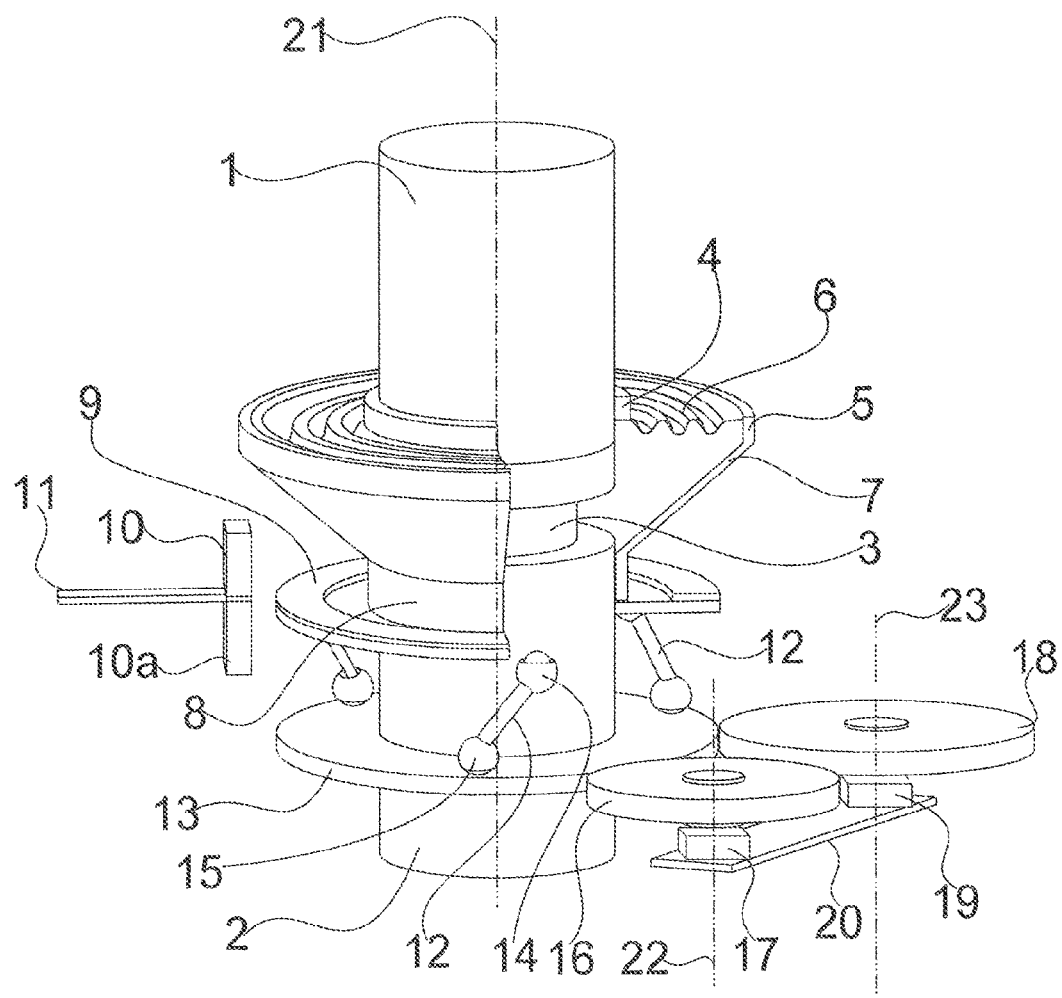

| | | | |
|---|---|---|---|
| 8,109,156 B2 | 2/2012 | Schmeisser et al. | |
| 2011/0303001 A1* | 12/2011 | Hirose | G01L 5/221 73/117.02 |
| 2012/0013275 A1* | 1/2012 | Angelis | H02K 21/12 318/115 |
| 2012/0152034 A1* | 6/2012 | Kaess | B62D 6/10 73/862.333 |
| 2013/0131927 A1* | 5/2013 | Ishihara | B62D 6/00 701/43 |
| 2013/0134966 A1* | 5/2013 | Hamaguchi | G01D 11/245 324/207.25 |

FOREIGN PATENT DOCUMENTS

| | | |
|---|---|---|
| DE | 10 2010 030 801 A1 | 1/2012 |
| EP | 1 426 750 A1 | 6/2004 |
| EP | 2 108 932 A2 | 10/2009 |

\* cited by examiner

ROTATION ANGLE AND TORSION ANGLE SENSOR

FIELD OF INVENTION

The invention relates to a rotation angle and torsion angle sensor. A preferred application of the embodiments of the invention is the steering of motor vehicles, in which not only the angle of rotation of a steering shaft is to be measured, but also the force exerted on the steering shaft forces which affect the torque. This torque can be measured as a torsion shaft angle of a torsion shaft which is arranged between two sections of the steering shaft torsion bar. The other parameters of the torsion bar are known.

BACKGROUND

The DE 3802684 A1 discloses a torque sensor for electric power steering with a torsion bar whose two ends are connected to the cylindrical sleeves, each of which surrounds about half of the torsion bar. Both sleeves carry at their mutually facing ends, each an annular neck, which is connected by flexible webs with a hollow cylindrical ring. Upon relative rotation of the two ends of the torsion bar, the latter ring is displaced in the axial direction, which is detected by the hollow-cylindrical ring associated sensor coils.

More generally speaking, a relative rotation of two portions of a shaft by means of a mechanical connection will be converted into an axial linear motion.

This general principle is also known in the following publications:

EP 2108932 A2 (U.S. Pat. No. 8,109,156 B2), in which an link guide is used,

U.S. Pat. No. 5,115,685 A, which shows a resiliently elastic element with deformable webs, U.S. Pat. No. 2,260,036 with a link guide and coupling of a sensor element via coil springs, U.S. Pat. No. 5,165,288, where a lever linkage moves a transmitter ring, U.S. Pat. No. 4,907,461, wherein two annular discs are coupled together by springs, U.S. Pat. No. 4,809,557 and U.S. Pat. No. 6,370,968, where again link guides be employed and finally U.S. Pat. No. 6,854,322 and U.S. Pat. No. 5,353,684.

For the simultaneous measurement of torsion and rotation angle, it is known from EP 1426750 1 and U.S. Pat. No. 7,258,027 B2 to use gears, magnets and magnetic sensors.

The above-described sensors for simultaneous measurement of torsion and rotation angle are mechanically very complex.

SUMMARY

One object of the invention is therefore to simplify the above-mentioned torsional and rotational angle sensor, and still maintain accurate measurement results.

For achieving this object, the invention proposes an angle of rotation and torsion angle sensor including a first shaft part and a second shaft part connected to each other via a torsion bar; a driven wheel connected to the second shaft part, the driven wheel engaged with a first sensor wheel and a second sensor wheel, the first sensor wheel and the second sensor wheel associated with a first sensor and a second sensor for detecting the rotational position; and a membrane circumferentially rigid and flexible in the axial direction, the membrane having a first terminal and a second terminal, the first terminal coupled directly or indirectly to the first shaft part and the second terminal connected with a sensor disc via a connecting device; wherein the sensor disc is coupled to the driven wheel via coupling elements, such that a relative rotation of the first shaft part and the second shaft part against one another causes an axial displacement of the sensor disc; and wherein a third sensor detects the axial position of the sensor disc.

The basic idea of the invention is the use of an annular membrane which is flexible in the circumferential direction as far as possible, and rigid in the axial direction. This membrane is directly or indirectly coupled to a first shaft part and having a sensor disc which is in turn coupled with a further annular disc. The latter annular disc is coupled to a second shaft portion. By this coupling, the sensor disc is axially displaceable. The axial position of the sensor wheel is detected by a sensor. In addition to the shaft part connected to the second annular disk, the rotation position of the corresponding shaft part is sensed by the sensor wheels whose rotating position is detected by sensors. The annular disc and the sensor wheels are engaged together, with meshing gears.

According to one embodiment of the invention, the coupling elements are rod-like elements which are articulated between the wheel sensor and the drive wheel, and which are non-stretchable in their longitudinal direction.

The coupling elements can also be a flexible or pliable, but non-extensible material strips. The elements are disposed between the sensor disc and the drive wheel.

According to one embodiment of the invention, the coupling elements are formed by a mechanical forced guide in the form of a threaded or a link guide.

According to a further variant, the coupling elements are formed by levers that are mounted on the drive wheel via a pivot, one end of the lever via a hinge to a connection of the membrane and another end of the lever via a further hinge, connected directly or indirectly to the sensor disc.

Preferably, these levers are arranged in two perpendicular legs which are rigidly connected to each other.

According to an embodiment of the invention, a connection of the membrane is connected by a funnel-like element with the sensor disc. The sensor disc can be connected through a link ring with the funnel-like element.

According to a further embodiment of the invention the membrane is connected to a drive wheel, which is in rotational engagement with a driven wheel, which is connected to the first shaft part.

According to one embodiment of the invention, a connector of the membrane is connected to an axially displaceable sleeve, which is connected to the sensor disc and a magnetic pen. An additional sensor is then associated with the magnetic pen.

According to a further embodiment of the invention, a connector of the membrane is joined with a threaded sleeve and a magnetic pin, wherein the threaded sleeve is connected to a threaded pin, which is fixedly connected with the sensor wheel.

According to a further variant of the invention, the membrane is rigid in the circumferential direction and in the axial direction and is coupled indirectly with the first shaft part through a driven wheel and a first shaft part, which is connected to the drive wheel. The driven wheel is axially displaceable and coupled with the first sensor wheel that is displaceable in relative rotation between the two shaft parts. The magnetic pin is fixedly connected to the driven wheel, and moves with it. The magnetic pin is associated again with the fixed further sensor, detecting the axial position of the magnetic pin.

For the coupling between the driven wheel and the sensor wheel, the variants described above can be used.

In the following, the invention is explained in detail by way of exemplary embodiments in conjunction with the drawings.

BRIEF DESCRIPTIONS OF THE DRAWINGS

Figure 2:
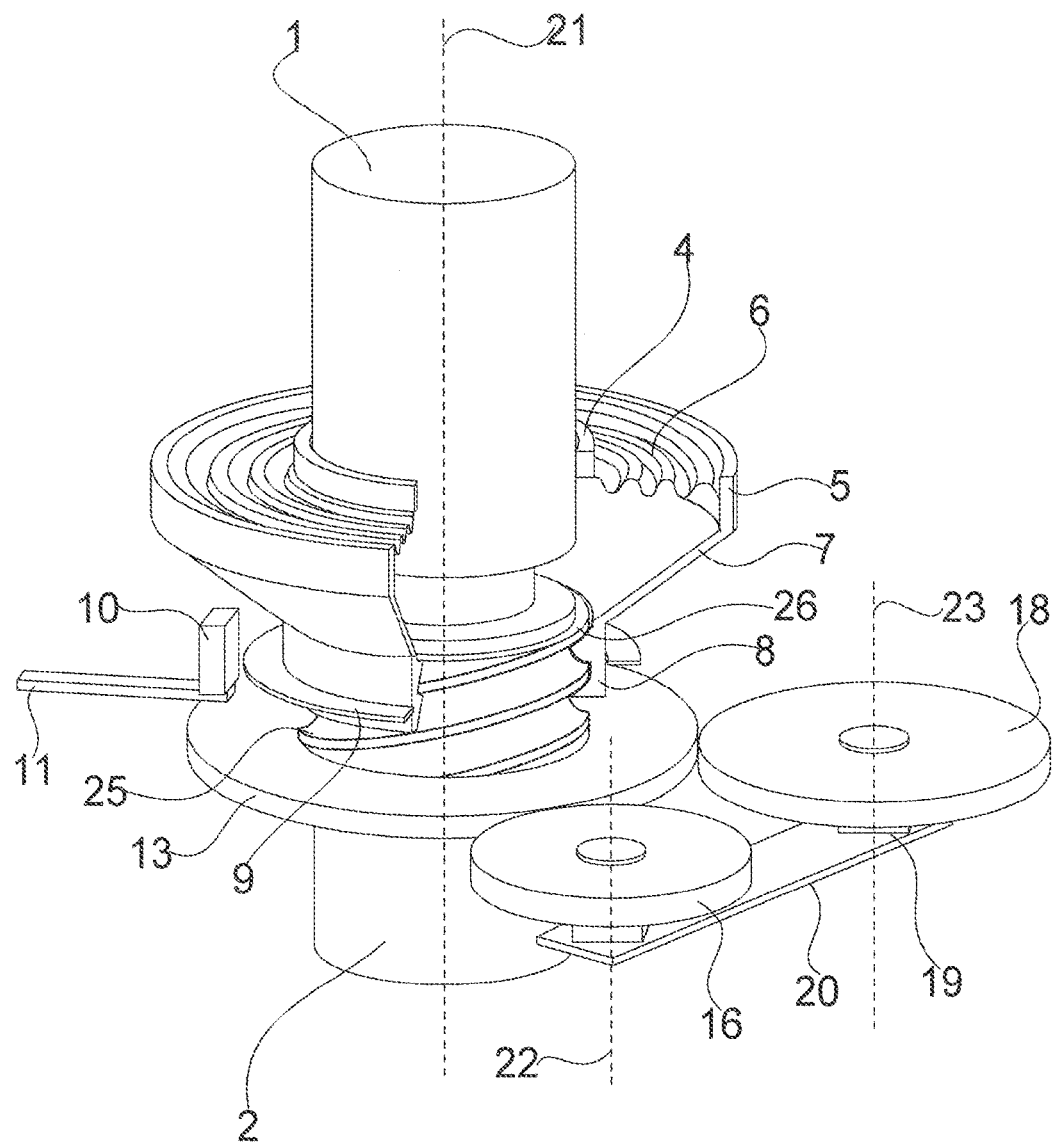
Figure 3:
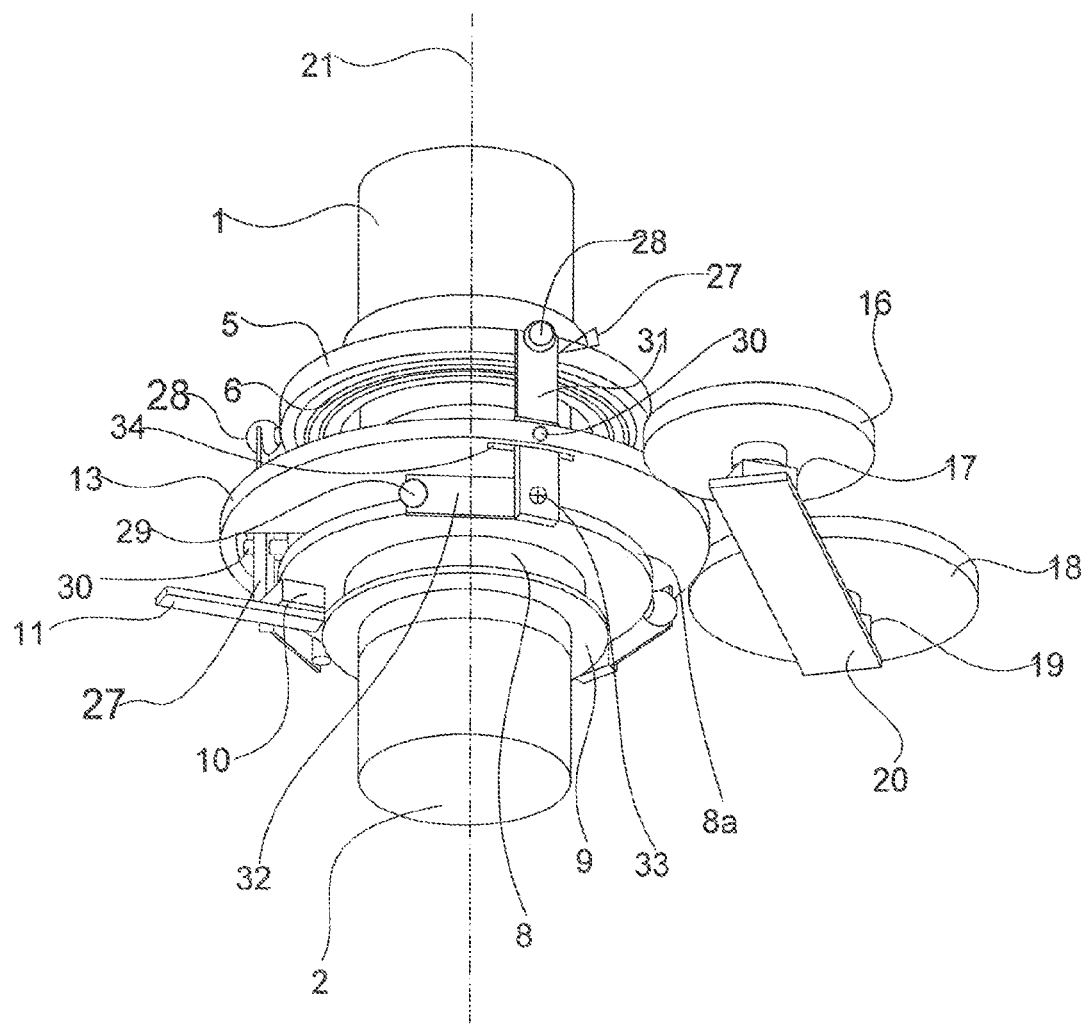
Figure 4:
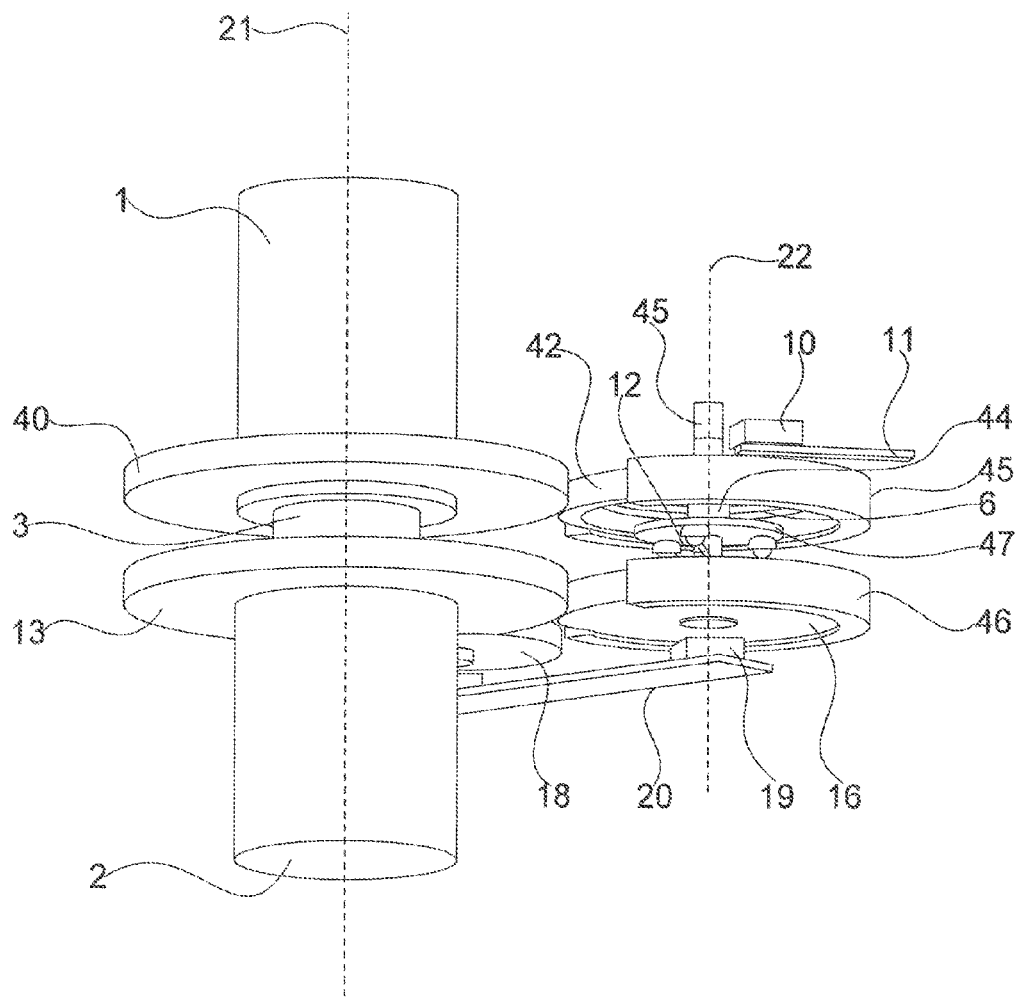
Figure 5:
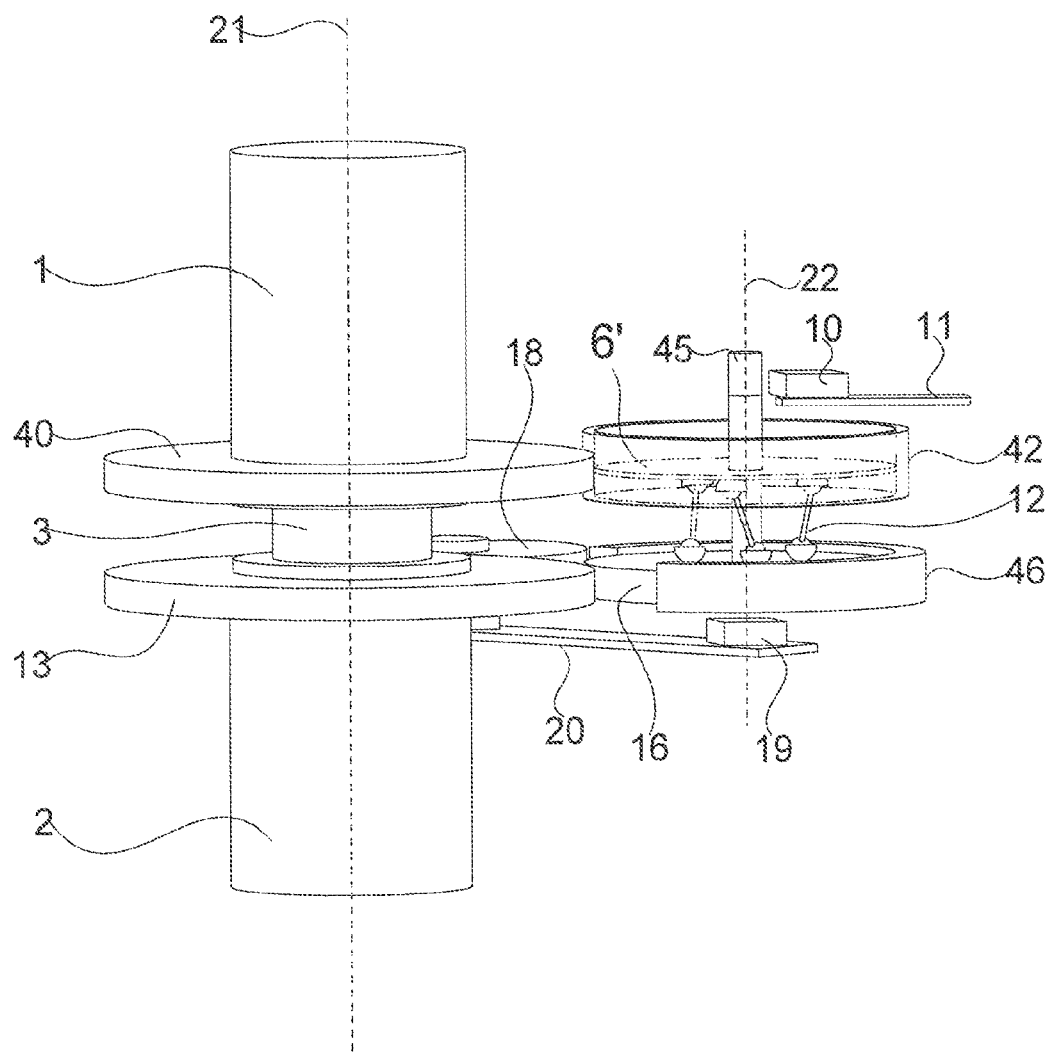
Figure 6:
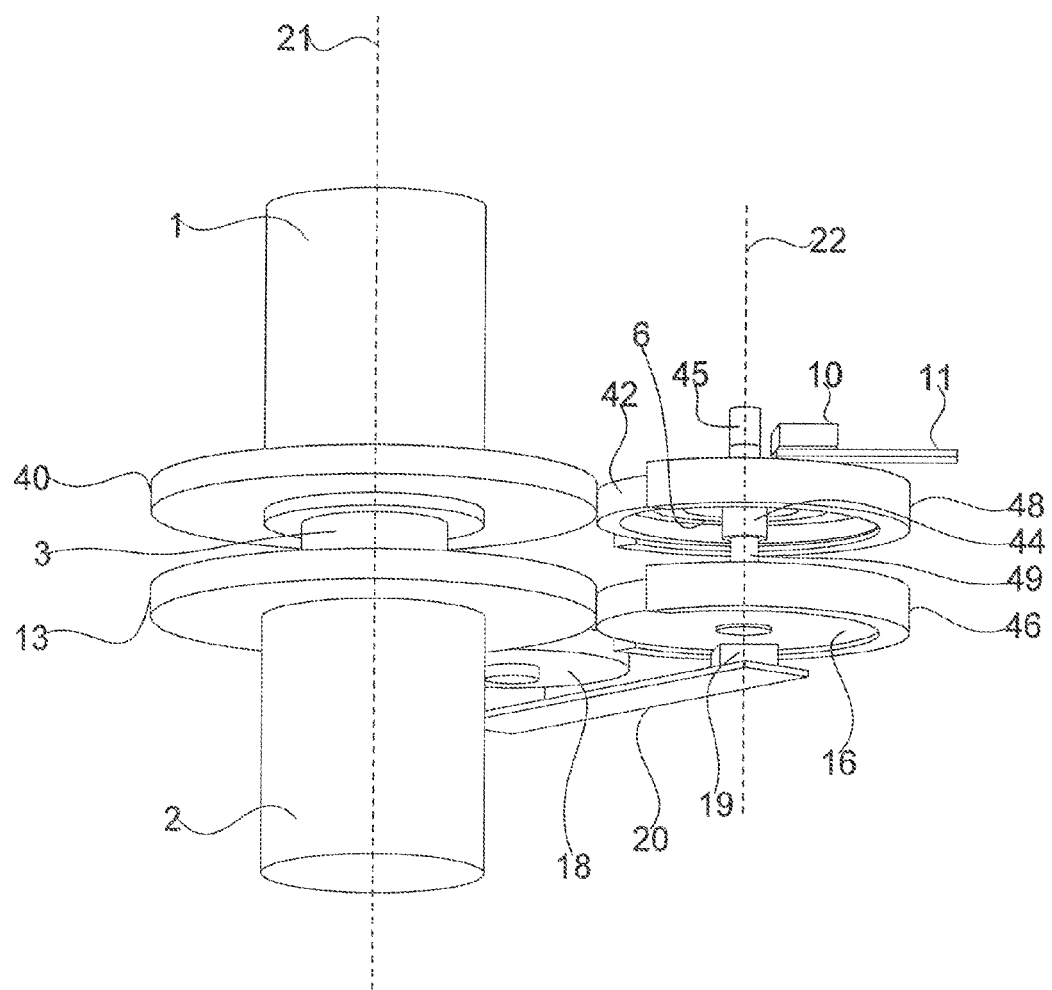
Figure 7:
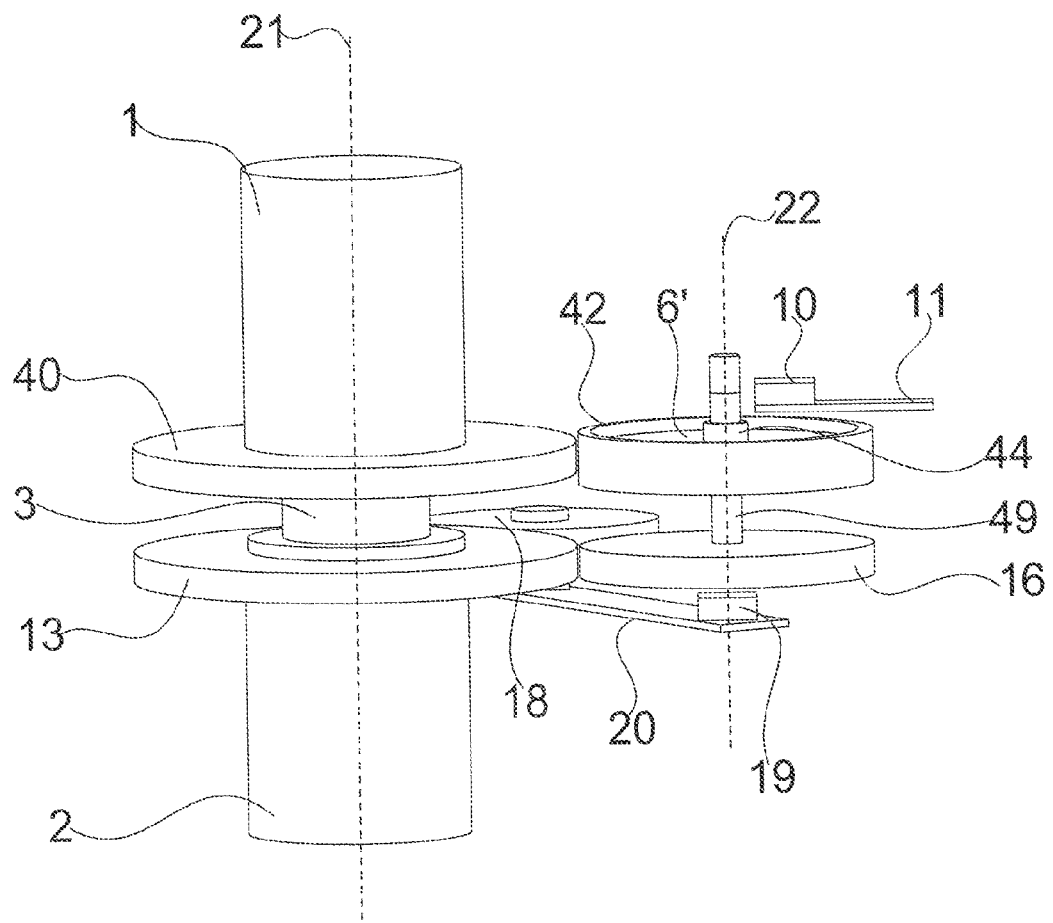

FIG. 1 a schematic, partly cutaway perspective view of a rotation angle and torsional angle sensor according to a first embodiment of the invention;

FIG. 2 a sensor according to a second embodiment of the invention;

FIG. 3 a sensor according to a third embodiment of the invention;

FIG. 4 a sensor according to a fourth embodiment of the invention;

FIG. 5 a sensor according to a fifth embodiment of the invention;

FIG. 6 a sensor according to a sixth embodiment of the invention;

FIG. 7 a sensor according to a seventh embodiment of the invention; and

Figure 8:
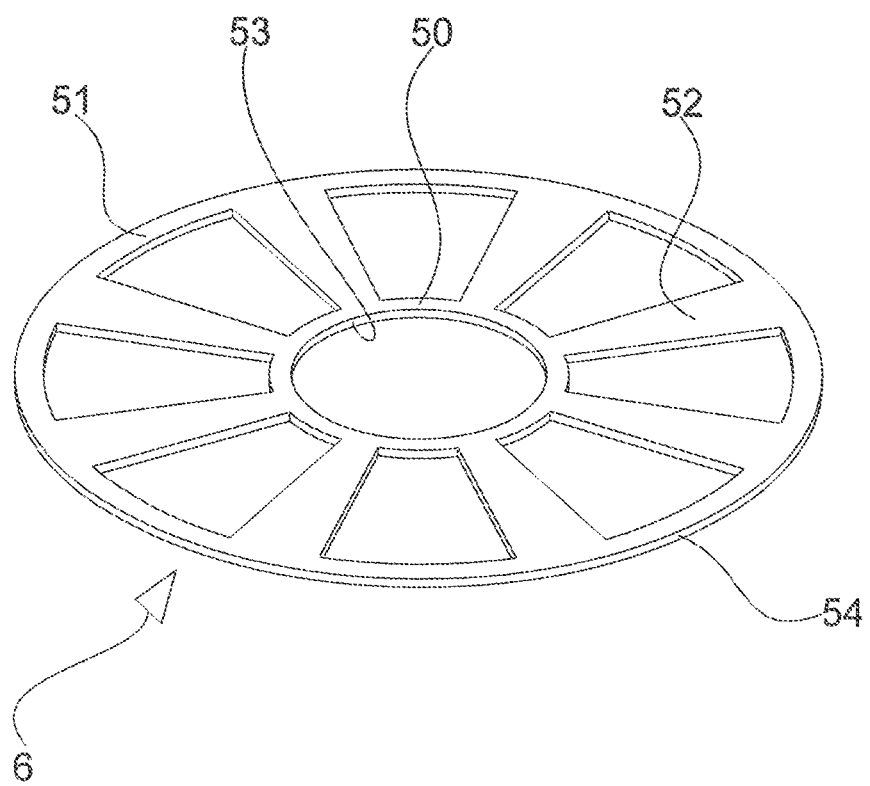

FIG. 8 a perspective view of an embodiment of a membrane used in the invention.

DETAILED DESCRIPTION

FIG. 1 shows a first embodiment of a rotation angle and torsion angle sensor, or an angle of rotation and torsion angle sensor, according to the invention. A first shaft part 1 and a second shaft part 2, coaxial to the first shaft part 1, are connected to each other through a torsion bar 3. If the shaft parts 1 and 2 are twisted relative to each other, the torsion bar 3 will rotate according to the torsional forces between the two shaft parts 1 and 2 (i.e., the acting torques of the two shaft parts 1 and 2).

On the first shaft part 1, is fixed a first membrane ring 4. A second membrane ring 5, having a larger diameter than the first membrane ring 4, is connected to the first membrane ring 4 via a membrane 6. The two membrane rings 4 and 5 form a first and a second connection with the membrane 6. The membrane 6 is flexible in an axial direction and rigid in the circumferential direction, such that a rotation of shaft part 1 is transmitted through the first membrane ring 4, to the membrane 6, and onto the second membrane ring 5. Thus, the second membrane ring 5 will follow the rotation of the first shaft part 1.

The second membrane ring 5 is concentric with the second shaft part 2. The second membrane ring 5 is connected, through a funnel, or funnel-like, element 7 and a guide ring 8 to a first sensor disc 9. The first sensor disc 9 is axially displaceably guided by the second shaft part 2. The first sensor disc 9 rotates uniformly with the first shaft part 1. The funnel element 7 is bridged in the axial direction of the torsion bar 3.

A first sensor 10, which is attached to a fixed holder 11, is associated with the first sensor disc 9. In the illustrated embodiment, the first sensor disc 9 is a magnetic disk having a magnetization and the first sensor 10 is a magnetic sensor which produces an electrical signal. The electric signal corresponds to the axial position of the first sensor disc 9.

The first sensor disc 9 is, as mentioned, displaceable in the axial direction due to the axial flexibility of the membrane 6. In order to achieve axial displacement during relative rotation between the first and second shaft parts 1 and 2, a plurality of coupling elements 12 are provided, which couple the first sensor disc 9 with a second sensor, or annular, disc 13. The second sensor disc 13 is coupled to the second shaft part 2, rotating along with the second shaft part 2, and is immovable in the axial direction. In the illustrated embodiment, the coupling elements 12 are rods, having at both ends hinges 14 and 15, in which the coupling elements 12 are connected to the first sensor disc 9 at end hinges 14, and the second sensor disc 13 at end hinges 15. The coupling elements 12 are further bendable in a longitudinal direction, however, inextensible coupling elements can be used instead of rods and hinges 14 and 15.

If the two shaft parts 1 and 2 are synchronously rotated, (i.e., there is no torsion on the torsion bar 3), the first sensor disc 9 and the second sensor disc 13 rotate synchronously, with the sensor disc 9 in a neutral axial rest position.

On the other hand, if the two shaft parts 1 and 2 are rotated relative to each other, the first sensor disc 9 and the second sensor disc 13 are rotated relative to each another as well, and the first sensor disc 9 is axially displaced according to a function of the torsion angle between the first shaft part 1 and the second shaft part 2 because of the flexible membrane 6 via the coupling elements 12. Thereby the first sensor disc 9 moves in the axial direction from a neutral rest position by a distance which is a function of the torsion angle. This displacement is detected by the first sensor 10, and outputted as an electrical signal. The mentioned function axial displacement versus torsion angle in this case is a cosine function. It is therefore advisable—as shown in FIG. 1—to arrange the coupling members 12 in the neutral position relative to a rotational axis 21 at an inclination angle, so that even in small torsion angles, a sufficiently large axial displacement occurs.

The absolute rotational position of the second shaft part 2 is measured by two sensor wheels 16 and 18, which are in rotational engagement with the second sensor disc 13. The second sensor disk 13 is a drive wheel, and in practice runs as a gear. The two sensor wheels 16 and 18 are also gear wheels which are in engagement with the gear formed by the second sensor disc 13. Both sensor wheels 16 and 18 are associated with a respective sensor 17 or 19, which detect the rotational position of the sensor wheels 16 and 18. For example, the two sensor wheels 16 and 18 are magnetized, and the sensors 17 and 19 are magnetic sensors, each of which generate an electrical output signal corresponding to the rotational position of the sensor associated with the wheels 16 and 18. The two sensor wheels 16 and 18 have different diameters, and in the case of gears different number of teeth, in order to measure in a conventional manner. Further, the two sensor wheels 16 and 18 have rotational angle ranges of more than 360°. The smaller sensor wheel detects, for example, a rotation angle range of 360°, while the larger sensor wheel is so designed that it is within the specified range, for example, three full rotations of the second shaft part 2, (i.e., 3 times 360°), makes one full rotation, whereby it can be determined within which full rotation (period), the second shaft part 2 is standing.

In the illustrated embodiment, the two sensors 17 and 19 are mounted on a common fixed sensor support 20. The common fixed sensor support 20 can also support the rotary axes 22 and 23 of the sensor wheels 16 and 18.

The two sensor wheels 16 and 18 can also be designed in a different known manner, for example, such that a sensor wheel, when going through the full measuring range of n*360° rotations to perform a number of m rotations and the other performs a number of m+1 rotations.

In practice, magnetic sensors are most commonly used. However, in other embodiments it is possible to use optical sensors, in which the sensor disc 9 and the sensor wheels 16 and 18 have corresponding optically scannable marks.

If above is spoken of axially, coaxial, etc., this always refers to the central axis 21, which is also the axis of rotation for the two shaft parts 1 and 2, the torsion bar 3, the first membrane ring 4, the second membrane ring 5, the membrane 6, the first sensor disc 9, and the second sensor disc 13.

The embodiment of FIG. 2 differs from that of FIG. 1 essentially in that the axial displacement of the first sensor disc 9 is effected by a screw thread 25 which is provided between the guide ring 8 and a threaded sleeve 26. The threaded sleeve 26 is fixedly connected to the second shaft part 2. The threaded sleeve 26 has an external thread and the guide ring 8 has a matching internal thread. At a relative rotation between the two shaft members 1 and 2, the guide ring 8, and therefore the first sensor disc 9, which is again detected by the sensor 10, will be axially displaced due to the screw thread 25. Again, this axial movement is made possible by the membrane 6.

Instead of a thread, a link guide can also be used. For example, one or more pins can be attached on the guide ring 8, which is/are guided in one or more grooves of the thread 26.

The embodiment of FIG. 3 illustrates the coupling between the membrane ring 5 and the wheel sensor disc 9 is made by hinged levers 27, which are connected through hinges 28 and 29 on the membrane ring 5 and on an axially displaceable annular disc 8a. The levers 27 have, in the neutral position parallel to the central axis 21, extending legs 31, whose free ends are connected through the hinge 28 with the membrane ring 5. Lever 27 further includes a second leg 32, which is connected to the first leg 31 and substantially perpendicular to the first leg 31. The free end of the second leg 32 is connected through the hinge 29 to the annular disc 8a. The leg 31 is pivotally mounted by a pivot pin 30 to the annular disk 13, which is immovably fixed to the shaft part 2.

In comparison with the embodiment of FIG. 1, the present embodiment of FIG. 3 achieves, during torsion between the two shaft parts 1 and 2, a larger axial displacement of the ring plate 8a, of the affiliated guide ring 8 and of the sensor disk 9, as the lever 27 forms a "transmission ratio" that is, during the pivoting of hinge 28, hinge 29, and thus the end point of the second leg 32, takes a larger axial movement than the common junction point 33 of the two legs 31 and 32.

In the illustrated embodiment of FIG. 3, the annular disc 13 includes slits 34 extending through the leg 31 and the pivot points 30. The length of the slits 34 in the circumferential direction is dimensioned such that the leg 31 can freely move in the full torsion area.

The annular disc 13 is rotatably connected to the second shaft part 2 and is, as seen in the axial direction, arranged between the second membrane ring 5 and the annular disc 8a. The annular disc 8a, the guide ring 8, and the sensor disc 9 move relative to the second shaft part 2 and are axially displaceable. Further, the annular disc 8a, the guide ring 8, the sensor disc 9, and the second shaft part 2 are connected with each other. The two sensor wheels 16 and 18 are driven in the same manner as in the embodiment of FIG. 1, by the annular disc 13 which is fixedly connected to the second shaft part 2.

In the embodiment of FIG. 4, on the two shaft parts 1 and 2, respectively, are a drive wheel 40 and the annular disc 13. Firmly fixed between the drive wheel 40 and the annular disc 13 is the torsion bar 3. The annular disc 13 drives the two sensor wheels 16 and 18, which are used in the same manner as in the above embodiments for determining the angle of rotation of the second shaft part 2. The drive wheel 40, connected to the first shaft member 1, drives a driven wheel 42, disposed coaxially with the sensor wheel 16, and rotatable about the axis of rotation 22. The driven wheel 42 is connected to the membrane 6 with a bearing ring 44 which is axially displaceable relative to the rotational axis 22 of the driven wheel 42. The bearing ring 44 is connected with a magnetic pin 45 which is therefore also axially displaceable relative to the axis of rotation 22. The magnetic sensor 10 is mounted on the fixed bracket 11. The driven wheel 42 is held non-displaceably by an outer bearing 45, which is axially relative to the axis of rotation 22. The bearing ring 44, coupled to membrane 6, is connected to an annular disc 47, which similarly is connected as in the embodiment of FIG. 1, by coupling elements 12 with the sensor wheel 16. The annular disc 47 immediately follows the rotational position of the driven wheel 42 in direction of rotation due to the membrane 6. The annular disc 47 can, however, move due to the coupling with the axially non-displaceable sensor wheel 16, which is also held immovably in an outer bearing 46 in the axial direction and thus shifts the magnetic pin 45 in the axial direction. Therefore, with relative torsion of the two shaft parts 1 and 2, the magnetic pin 45 is shifted. The magnetic sensor 10 detects this displacement and puts out a signal corresponding to the torsion between the two shaft parts 1 and 2. Analogous to the embodiment of FIG. 1, the annular disc 47 can also be designed as a sensor disc similar to the sensor disc 9 of FIG. 1. In such an embodiment, the sensor 10 scans the axial position of the annular disc 47, and is arranged opposite to the annular disc 47.

The diameter of the drive wheel 40 and the annular disc 13 are substantially equal, or in the case that the drive wheel 40 and the annular disc 13 are gear wheels, have an equal number of teeth. Likewise, the diameter or number of teeth of the sensor wheel 16 and the driven wheel 42 are the same.

Briefly summarized, the coupling principle, as applied to the membrane 6 of FIG. 1, is applied to the coupling elements 12 on the sensor wheel 16 and the driven wheel 42 whose common axis of rotation 22 is parallel to the central axis 21 of the two shaft members 1 and 2.

The embodiment of FIG. 5 differs from that of FIG. 4 substantially in that the driven wheel 42 is coupled through a rigid membrane 6' and the coupling elements 12 to the axially non-displaceable sensor wheel 16. The driven wheel 42 is therefore axially movable relative to the common axis of rotation 22. The magnetic pin 45 is fixedly connected to the driven wheel 42. The driven wheel 42 is large enough in its axial height, that even with axial displacement, the driven wheel 42 is always engaged with the drive wheel 40.

The embodiment of FIG. 6 is similar to that of FIG. 4. Further the embodiment of FIG. 6 incorporates the threaded coupling principle of the embodiment of FIG. 2. The driven wheel 42 and the sensor wheel 16 are supported by external bearings 46 and 48, which are axially fixed to the common axis of rotation 22.

The driven wheel 42 is connected, through the membrane 6, to the axially displaceable bearing ring 44, which in this embodiment is designed as a threaded sleeve with an internal thread. The bearing ring 44 is further connected to the magnetic pin 45. The bearing ring 44 and the magnetic pin 45 are thus axially displaced relative to the axis of rotation 22. The sensor wheel 18 is connected to a threaded pin 49, which in this embodiment has an external thread which engages the internal thread of the bearing ring 44. The sensor wheel 16 and the threaded pin 49 are held immovably in the axial direction through the outer bearing 46. At relative rotation between the driven wheel 42 and the sensor wheel 16, the bearing ring 44 shifts due to the threaded connection to the threaded pin 49 in the axial direction, and thus so does the magnetic pin 45, whose axial position is detected by the sensor 10.

In the embodiment of FIG. 7, the driven wheel 42, together with the magnetic pin 45, is axially displaceable by a rigid membrane 6' analogous to the embodiment of FIG. 5. The sensor wheel 16 is axially undisplaceable and again includes the threaded pin 49, which engages in the bearing ring 44 of the output wheel 42. The bearing ring 44 has a corresponding internal thread and is rigidly connected to the driven wheel 42. The magnetic pin 45 is also rigidly connected to the bearing ring 44. At relative rotation between the sensor wheel 16 and the driven wheel 42, the driven wheel 42 moves together with the bearing ring 44 and the magnetic pin 45 in the axial direction. Such movement is detected by the sensor 10.

FIG. 8 shows an embodiment of the membrane 6, which has a circular inner ring 50, a concentric circular outer ring 51 and a plurality of radial webs 52 connecting the two rings 50 and 51. The two rings 50 and 51 in this embodiment form connections 53 and 54 of the membrane 6. The membrane 6 can be punched from a planar plate of a resilient material such as spring steel. Due to the described shape of the inner ring 50 and the outer ring 51, the inner ring 50 and the outer ring 51 are rigidly connected to each other as far as possible in the circumferential direction. The inner ring 50 and the outer ring 51 are movable relative to each other in the axial direction by bending of the webs 52.

The invention claimed is:

1. An angle of rotation and torsion angle sensor comprising:
    a first shaft part and a second shaft part connected to each other via a torsion bar, the first shaft part and the second shaft part aligned with one another along an axis, the axis defining an axial direction;
    a driven wheel connected to the second shaft part, the driven wheel engaged with a first sensor wheel and a second sensor wheel, the first sensor wheel and the second sensor wheel associated with a first sensor and a second sensor for detecting the rotational position; and
    a membrane circumferentially rigid and flexible in the axial direction, the membrane having a first terminal and a second terminal, the first terminal coupled directly or indirectly to the first shaft part and the second terminal connected with a sensor disc via a connecting device;
    wherein the sensor disc is coupled to the driven wheel via coupling elements, such that a relative rotation of the first shaft part and the second shaft part against one another causes an axial displacement of the sensor disc; and
    wherein a third sensor detects the axial position of the sensor disc.

2. The angle of rotation and torsion angle sensor according to claim 1, wherein the coupling elements are rod-like elements which are articulated between the wheel sensor and the drive wheel, and which are non-stretchable in their longitudinal direction.

3. The angle of rotation and torsion angle sensor according to claim 1, wherein the coupling elements are formed by a mechanical forced guide in the form of a thread or a link guide.

4. The angle of rotation and torsion angle sensor according to claim 1, wherein the coupling elements are formed by levers that are mounted to the drive wheel via a pivot hinge, and a first end of the lever is connected to the membrane via a first hinge, and a second end of the lever is connected, directly or indirectly, to the sensor disc via a second hinge.

5. The angle of rotation and torsion angle sensor according to claim 4, wherein the lever of each coupling element includes two orthogonally arranged legs which are rigidly connected to each other.

6. The angle of rotation and torsion angle sensor according to claim 2, wherein the membrane is connected to the sensor disc via a funnel-like element and a guide ring.

7. The angle of rotation and torsion angle sensor according to claim 1, wherein the membrane is connected to the driven wheel, the driven wheel rotationally engaged with a drive wheel, the drive wheel connected to the first shaft part.

8. The angle of rotation and torsion angle sensor according to claim 7, wherein the connection of the membrane is connected with an axially displaceable sleeve, which is in turn connected to the sensor disc and to the magnetic pin.

9. The angle of rotation and torsion angle sensor according to claim 7, wherein the membrane is connected with a threaded sleeve and a magnetic pin, where the threaded sleeve is connected to a threaded pin, the threaded pin firmly connected to the sensor wheel.

10. The angle of rotation and torsion angle sensor according to claim 1,
    wherein the membrane has a circular inner ring, a concentric circular outer ring and a plurality of radial extending webs connecting the inner ring and the outer ring.

11. A rotation angle and torsion angle sensor comprising:
    a first shaft part and a second shaft part, the first shaft part and the second shaft part connected to each other via a torsion bar, the first shaft part and the second shaft part aligned with one another along an axis, the axis defining an axial direction;
    a driven wheel connected to the second shaft part, the drive wheel rotatably engaged with a first sensor wheel and a second sensor wheel, the first sensor wheel associated with a first sensor and the second sensor wheel associated with a second sensor for detecting rotational position;
    a circumferentially rigid and axially moveable membrane, which is indirectly coupled through a driven wheel to a drive wheel, the drive wheel connected to the first shaft part;
    wherein the driven wheel is displaceable in the axial direction and is coupled to the first sensor wheel, such that upon relative rotation between the first shaft part and the second shaft part, the drive wheel is displaced, whereby a magnetic pin, fixedly connected to the drive wheel, is also displaced, the axial position of the magnetic pin detected by a third sensor.

12. An angle of rotation and torsion angle sensor comprising:
    a first shaft and a second shaft connected to each other via a torsion bar, the first shaft part and the second shaft part aligned with one another along an axis, the axis defining an axial direction;

a driven wheel connected to the second shaft, the driven wheel engaged with a first sensor wheel and a second sensor wheel;
a first sensor configured to detect rotational position and associated with the first sensor wheel;
a second sensor configured to detect rotational position and associated with the second sensor wheel;
a membrane circumferentially rigid and flexible in the axial direction, the membrane having a first terminal and a second terminal, the first terminal coupled to the first shaft and the second terminal connected to a sensor disc;
wherein the sensor disc is coupled to the driven wheel such that a relative rotation of the first shaft and the second shaft with respect to one another causes an axial displacement of the sensor disc; and
a third sensor configured to detect an axial position of the sensor disc.

13. A rotation angle and torsion angle sensor comprising:
a first shaft and a second shaft, the first shaft and the second shaft connected to each other via a torsion bar, the first shaft part and the second shaft part aligned with one another along an axis, the axis defining an axial direction;
a driven wheel connected to the second shaft, the drive wheel rotatably engaged with a first sensor wheel and a second sensor wheel, the first sensor wheel associated with a first sensor for detecting rotational position and the second sensor wheel associated with a second sensor for detecting rotational position;
a circumferentially-rigid and axially-moveable membrane indirectly coupled through a driven wheel to a drive wheel, the drive wheel connected to the first shaft;
wherein the driven wheel is displaceable in the axial direction and is coupled to the first sensor wheel, such that upon relative rotation between the first shaft and the second shaft, the drive wheel is displaced, whereby a magnetic pin, fixedly connected to the drive wheel, is also displaced; and
a third sensor configured to detect an axial position of the magnetic pin.

* * * * *